United States Patent [19]

Nakaki et al.

[11] Patent Number: 5,258,237
[45] Date of Patent: Nov. 2, 1993

[54] MAGNETO-OPTIC RECORDING MEDIUM

[75] Inventors: Yoshiyuki Nakaki; Takashi Tokunaga; Tatsuya Fukami; Motohisa Taguchi; Kazuhiko Tsutsumi, all of Amagasaki, Japan

[73] Assignee: Mitsubishi Denki Kabushiki Kaisha, Tokyo, Japan

[21] Appl. No.: 815,547

[22] Filed: Dec. 27, 1991

Related U.S. Application Data

[63] Continuation of Ser. No. 610,818, Nov. 8, 1990, abandoned.

[30] Foreign Application Priority Data

Nov. 14, 1989 [JP] Japan .................. 1-296857

[51] Int. Cl.$^5$ .............................. G11B 5/66
[52] U.S. Cl. .................. 428/694 EC; 369/13; 428/900
[58] Field of Search .................. 428/694, 900; 369/13

[56] References Cited

U.S. PATENT DOCUMENTS

| | | | |
|---|---|---|---|
| 4,293,621 | 10/1981 | Togami | 428/678 |
| 4,518,657 | 5/1985 | Yanagida | 428/450 |
| 4,799,114 | 1/1989 | Tsunashima | 360/59 |
| 4,878,132 | 10/1989 | Aratani et al. | 369/13 |
| 4,882,231 | 11/1989 | Aratani | 428/686 |
| 4,908,809 | 3/1990 | Tadokoro et al. | 369/13 |
| 4,955,007 | 9/1990 | Aratani et al. | 369/13 |

FOREIGN PATENT DOCUMENTS

| | | |
|---|---|---|
| 258978 | 3/1988 | European Pat. Off. |
| 0285241 | 10/1988 | European Pat. Off. |
| 0319004 | 6/1989 | European Pat. Off. |
| 0382859 | 8/1989 | European Pat. Off. |
| 0352548 | 1/1990 | European Pat. Off. |

OTHER PUBLICATIONS

Iida, Haruhisa et al "Recording Power Characteristics of 130 mm Over Writable MO Disk by Laser Power Modulation Method" Proc. Int. Symp. on Optical Memory, Jap. J. Appl. Phys., vol. 28, Supp. 28-3, (1989) pp. 367-370.

Primary Examiner—Paul J. Thibodeau
Assistant Examiner—R. Follett
Attorney, Agent, or Firm—Wolf, Greenfield & Sacks

[57] ABSTRACT

A megneto-optic recording medium which is comprised of a first, a second, a third and a fourth magnetic layers coupled each other between the adjacent layers by an exchange force, wherein said first through fourth magnetic layers satisfy $T_{c1} < T_{c2}$, $T_{c3} < T_{c2}$, $T_{c1} < T_{c4}$ and $T_{c3} < T_{c4}$ in relation to respective Curie points and satisfy the following conditions at room temperature;

(1) the direction of sublattice magnetizations of the transition metal (TM) of the third and fourth magnetic layers is coincident with each other in the initializing magnetic field, (2) a magnetic field necessary for changing the direction of sublattice magnetization of TM of the first magnetic layer from the state where it is coincident with that of the second magnetic layer to the state where it is reverse to that of the second magnetic layer when the direction of sublattice magnetization of TM of the second magnetic layer is reverse to that of the third and fourth magnetic layers is larger than a magnetic field necessary for changing the direction of sublattice magnetization of TM of the second magnetic layer from the state where it is coincident with that of the first magnetic layer to the state where it is reverse to that of the first magnetic layer when the direction of sublattice magnetization of TM of the first magnetic layer is reverse to that of the third and fourth magnetic layers, (3) the magnetization of the fourth magnetic layer is not inverted during recording and reproducing, and (4) the magnetization of the first magnetic layer is not inverted by the inversion of the magnetization of the second magnetic layer.

11 Claims, 7 Drawing Sheets

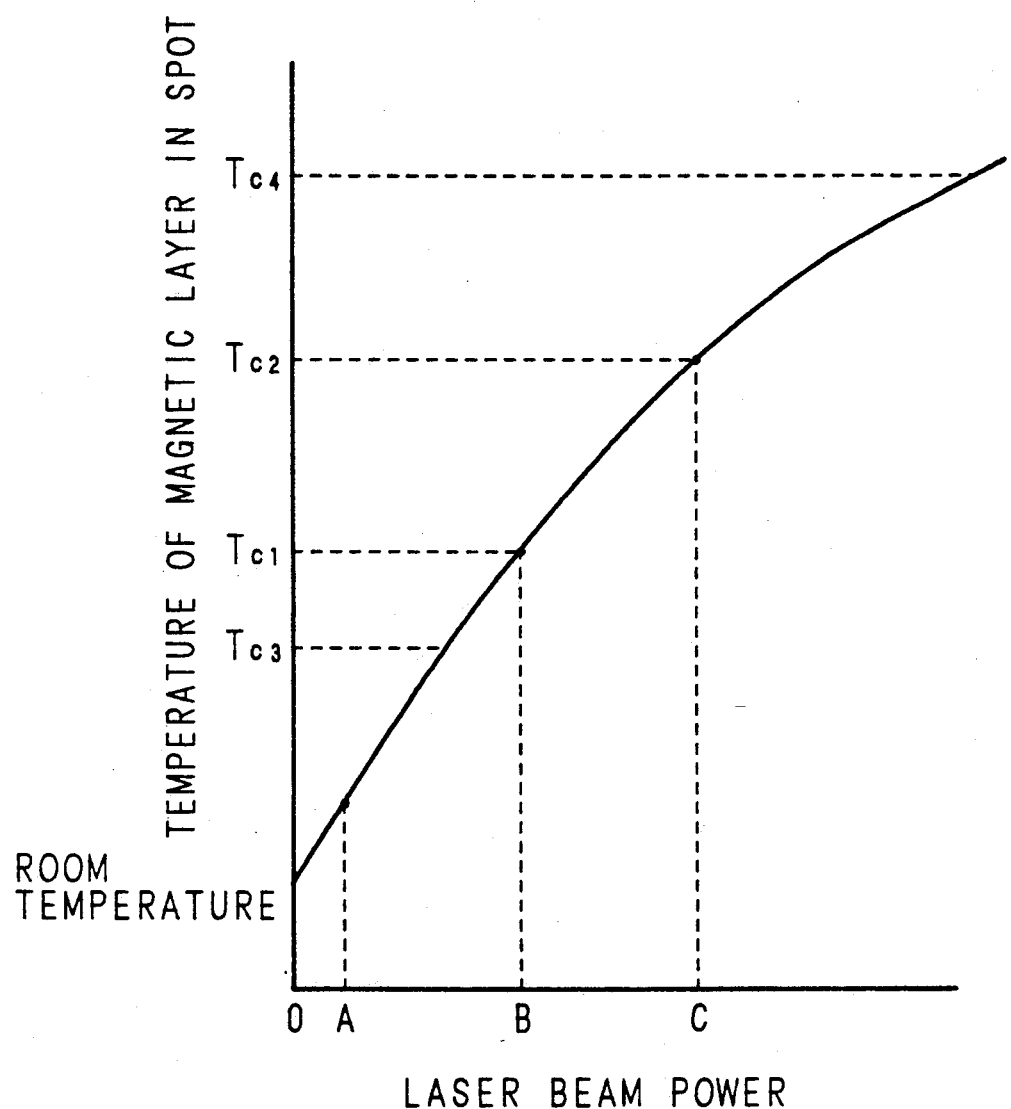

MAGNETO-OPTIC RECORDING MEDIUM

This is a continuation of copending application Ser. No. 07/610,818 filed on Nov. 8, 1990, now abandoned.

BACKGROUND OF THE INVENTION

1. Field of the Invention

This invention relates to a magneto-optic recording medium designed to overwrite data directly through optical modulation.

2. Description of Related Art

Referring to FIGS. 1, 2 and 3, there respectively are indicated a perspective view substantially illustrating the structure of a conventional optical recording/reproducing apparatus disclosed, for example, in a draft for a speech at the 34th Applied Physics Related Convention, spring in 1987, 28P-ZL-3, a cross-sectional view showing the optically recording/reproducing state of a conventional magneto-optic recording medium and a graph showing the characteristic of the change of the laser beam power for recording in the area of the conventional magneto-optic recording medium.

A magneto-optic recording medium 1 (hereinafter referred to as a recording medium 1) in FIGS. 1-3 is comprised of a substrate 2 made of glass or plastic, a first magnetic layer 3 made of e.g., $Tb_{21}Fe_{79}$ and a second magnetic layer 4 made of, e.g., $Gd_{24}Tb_3Fe_{73}$. The recording medium 1 is rotated in a direction shown by an arrow a of FIGS. 1 and 2 by a driving mechanism (not shown). The first magnetic layer 3 is similar to a recording layer and a read-out layer in this invention. The second magnetic layer 4 is called an auxiliary layer, works so that an overwriting function, that is, a function to overwrite a new data on an old data at real time is effected, which will be described later. The exchange coupling force exerted between the first and second magnetic layers 3 and 4 is effective to make the direction of magnetization of the first magnetic layer 3 coincident with that of the magnetic layer 4. Supposing that the first and second magnetic layers 3 and 4 have the Curie points $T_{c1}$ and $T_{c2}$, the coercive force around the room temperature $H_{c1}$ and $H_{c2}$, and the exchange coupling force at the room temperature $H_{w1}$ and $H_{w2}$, respectively, the following formulae are satisfied;

$$T_{c1} < T_{c2}$$
$$H_{c1} - H_{w1} > H_{c2} + H_{w2} \quad (P\ type)$$

An objective lens 5 is provided above the recording medium 1. It condenses a laser beam and forms a condensing spot 6 on the recording medium 1. A bias magnet 8 confronts to the objective lens 5 to generate a magnetic field of 200-600 Oe, with the recording medium 1 between the objective lens 5 and the bias magnet 8. Further, an initializing magnet 9 is provided at the upper side than the bias magnet 8 in the rotating direction of the recording medium 1, which generates about 5 KOe magnetic field to initialize the second magnetic layer 4. In FIG. 1, the left side to the one-dot chain line represents a new data (DN) area, while the right side to that represents an old data (DO) area. Meanwhile, numeral 7 in FIG. 2 designates an area where a binary-coded data is "1" having the direction of magnetization of the first magnetic layer 3 oriented upwards. Furthermore, an axis of ordinate in the graph of FIG. 3 expresses the laser beam power, and an axis of abscissa represents the area, with $R_1$ and $R_o$ representing the laser beam power for recording the data "0", respectively.

The operation of the recording medium 1 will be discussed hereinbelow.

In the first place, description is directed to the reproducing operation of data recorded in the recording layer, that is, first magnetic layer 3. As shown in FIG. 2, the first magnetic layer 3 is magnetized upwards or downwards in a thicknesswise direction corresponding to the binary code, namely, "1" and "0". For reproducing the recorded data, the direction of the magnetization of the first magnetic layer 3 at the condensing spot 6 is converted to optical data by the conventionally known optical Kerr effect to detect the data in the recording medium 1. At this time, the power of the laser beam radiated to the recording medium 1 is corresponding to a power A shown in the graph of FIG. 4, which shows a temperature change of magnetic layer in spot in relation to laser beam power. When the recording medium 1 is radiated at the condensing spot 6 by the laser beam of this power, the maximum temperature of each of the first and second magnetic layers 3 and 4 does not reach its Curie point $T_{c1}$ or $T_{c2}$. Therefore, even when the recording medium is radiated by the laser beam of this power, the direction of magnetization, i.e., recording data is never erased.

Overwriting operation will now be discussed. The initializing magnet 9 of FIG. 1 generates a magnetic field of the intensity $H_{ini}$ in a direction shown by an arrow b (upwards). The relation of the magnetic field $H_{ini}$ to the coercive forces and exchange coupling forces of the first and second magnetic layers 3 and 4 is expressed as follows;

$$H_{c1} - H_{w1} > H_{ini} > H_{c2} + H_{w2}$$

Accordingly, when the recording medium 1 is rotated in the direction of arrow a and passes through the position of the initializing magnet 9, the direction of magnetization of the second magnetic layer 4 is made upwards irrespective of the magnetization direction of the first magnetic layer 3. At this time, the magnetization direction of the first magnetic layer 3 is maintained as it is without being influenced by the magnetic field generated by the initializing magnet 9 or by the exchange coupling force exerted by the second magnetic layer 4 at around the room temperature.

In recording the data "1", i.e., when the direction of the magnetization of the first magnetic layer 3 is made upwards, the power of the laser beam corresponds to a power B in FIG. 4. At this time, the temperature in the condensing spot 6 is raised to exceed the Curie point $T_{c1}$ of the first magnetic layer 3, but does not reach the Curie point $T_{c2}$ of the second magnetic layer 4. Accordingly, although the magnetization of the first magnetic layer 3 is erased, the direction of magnetization of the second magnetic layer 4 is maintained upwards as oriented by the initializing magnet 9. Subsequently, when the recording medium 1 is further rotated with the condensing spot 6 away and the temperature of the first magnetic layer 3 becomes lower than the Curie point $T_{c1}$, the direction of magnetization of the second magnetic layer 4 is transferred to the first magnetic layer 3, whereby the first magnetic layer 3 is magnetized upwards, that is, in the direction corresponding to the data "1".

On the other hand, in recording the data "0" to orient the magnetization of the first magnetic layer 3 in the downward direction, the power of the laser beam corresponds to a power C shown in FIG. 4. The temperature in the condensing spot 6 is raised, exceeding not only the Curie point $T_{c1}$ of the first magnetic layer 3 but the Curie point $T_{c2}$ of the second magnetic layer 4. As a result, both the first and second magnetic layers 3 and 4 are demagnetized in the condensing spot 6. When the recording medium 1 is further rotated, with the condensing spot away and the temperature of the second magnetic layer 4 becomes lower than the Curie point $T_{c2}$, the magnetization direction of the second magnetic layer 4 is made downwards by a weak magnetic field applied by the bias magnet 8 in a direction shown by an arrow c in FIG. 8. In the succeeding step where the temperature of the first magnetic layer 3 becomes lower than the Curie point $T_{c1}$, the magnetization direction of the second magnetic layer 4 is transferred to the first magnetic layer 3, whereby the direction of magnetization of the first magnetic layer 3 is made downwards, i.e., in the direction corresponding to the data "0".

Thus, by changing the power of the laser beam to a power B or C in accordance with the binary code "0" or "1" to be recorded, a new data can be overwritten at real time on the old data.

Since the conventional magneto-optic recording medium is constituted in the above-described structure, the inverted magnetic field of the second magnetic layer at the room temperature is as large as 3 KOe, whereby an initializing magnet able to generate at least 3 KOe or larger magnetic field is necessary. Accordingly, the conventional optical recording/reproducing apparatus using the magneto-optic recording medium is disadvantageously bulky in size and is not free from adverse influences given by the large initializing magnetic field.

SUMMARY OF THE INVENTION

Accordingly, this invention has been devised to solve the above-described disadvantages inherent in the prior art.

An essential object of this invention is to provide a magneto-optic recording medium designed to overwrite data even when the initializing magnetic field is sufficiently small.

A further object of this invention is to provide a magneto-optic recording medium which allows an optical recording/reproducing apparatus to be simplified and compact.

A magneto-optic recording medium of this invention is comprised of a first magnetic layer with vertical magnetic anisotropy, a second magnetic layer superposed on the first magnetic layer and coupled thereto by an exchange force, a third magnetic layer superposed on the second magnetic layer and coupled thereto by an exchange force and a fourth magnetic layer superposed on the third magnetic layer and coupled thereto by a exchange force. The magneto-optic recording medium satisfies $T_{c1}<T_{c2}$, $T_{c3}<T_{c2}$, $T_{c1}<T_{c4}$ and $T_{c3}<T_{c4}$ when the Curie points of the first through fourth magnetic layers are represented respectively by $T_{c1}$, $T_{c2}$, $T_{c3}$ and $T_{c4}$, and satisfies the following conditions at the room temperature;

(1) The sublattice magnetization of the transition metal of the first magnetic layer is oriented to be coincident with that of the fourth magnetic layer in the initializing magnetic field.

(2) A magnetic field necessary for changing the direction of sublattice magnetization of the transition metal of the first magnetic layer from the state where it is coincident with that of the second magnetic layer to the state where it is reverse to that of the second magnetic layer when the direction of sublattice magnetization of the transition metal of the third and fourth magnetic layer is reverse to that of the second magnetic layer is larger than a magnetic field necessary for changing the direction of sublattice magnetization of the transition metal of the second magnetic layer from the state it is coincident with that of the first magnetic layer to the state where it is reverse to that of the first magnetic layer when the direction of sublattice magnetization of the transition metal of the third and fourth magnetic layers is reverse to that of the first magnetic layer, (3) The magnetization of the fourth magnetic layer is not inverted during recording and reproducing, and (4) The magnetization of the first magnetic layer is not inverted by the inversion of the magnetization of the second magnetic layer.

The above and further objects and features of the invention will more fully be apparent from the following detailed description with the accompanying drawings.

BRIEF DESCRIPTION OF THE DRAWINGS

FIG. 7 is a graph showing the characteristic of the relation between the power of the laser beam and the temperature of a magnetic layer in a spot of the magneto-optic recording medium according to this invention.

DESCRIPTION OF THE PREFERRED EMBODIMENTS

This invention will now be fully described with reference to the accompanying drawings in conjunction with preferred embodiments thereof.

Figure 1:
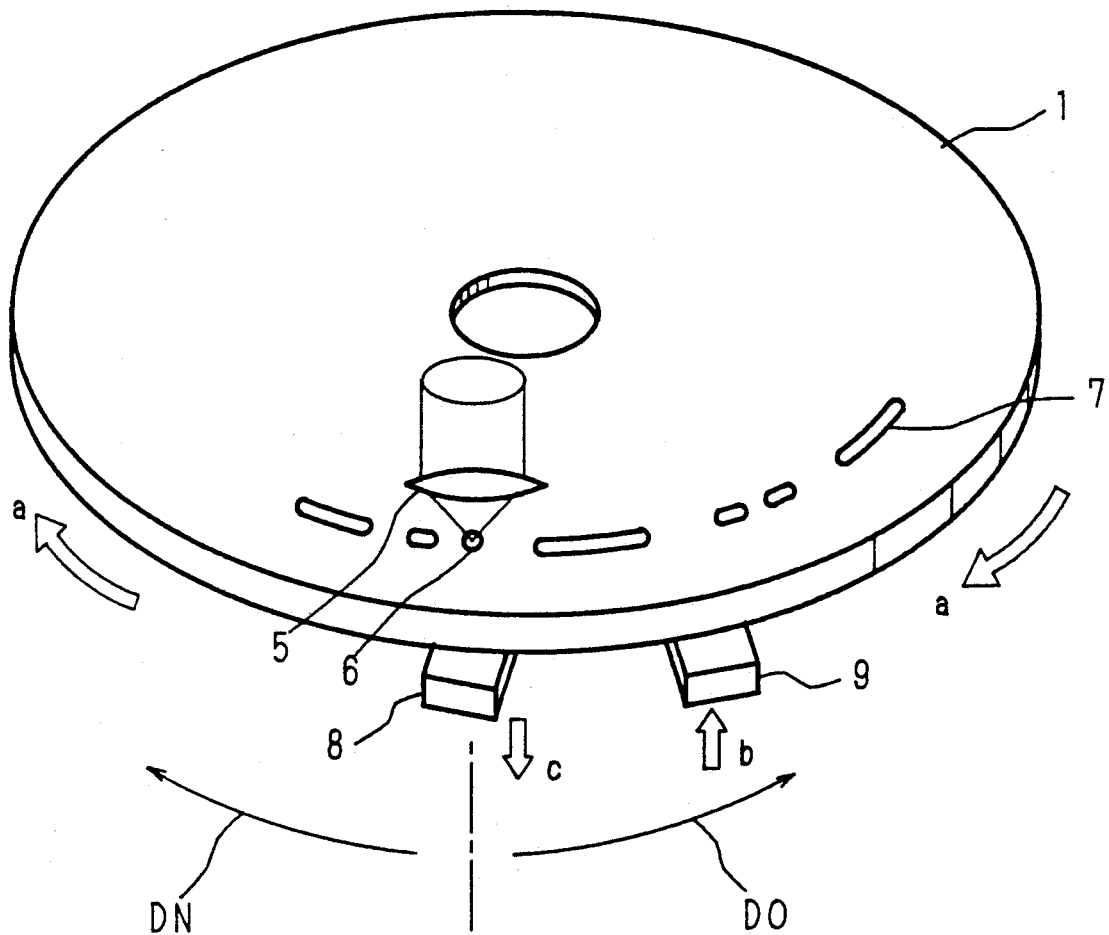
FIG. 1 is a perspective view substantially showing the structure of a conventional optical recording/reproducing apparatus.
Figure 2:
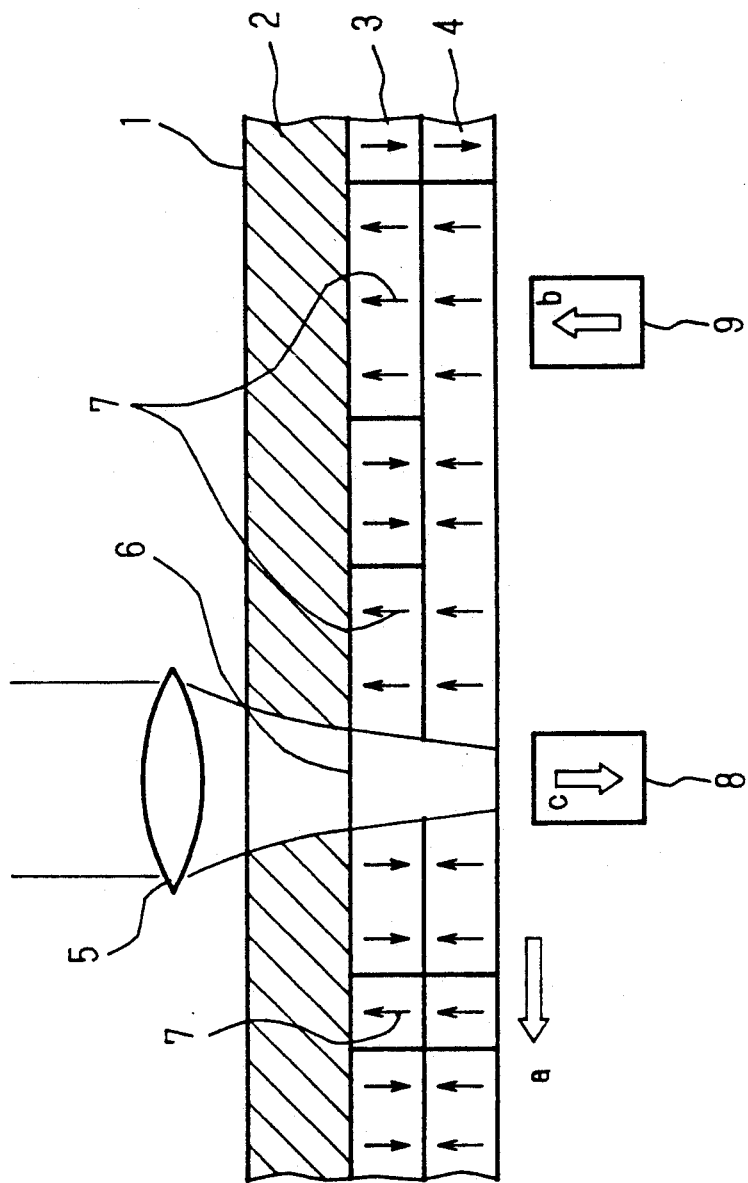
FIG. 2 is a sectional view showing the optically recording/reproducing state of a conventional mangeto-optic recording medium.
Figure 3:
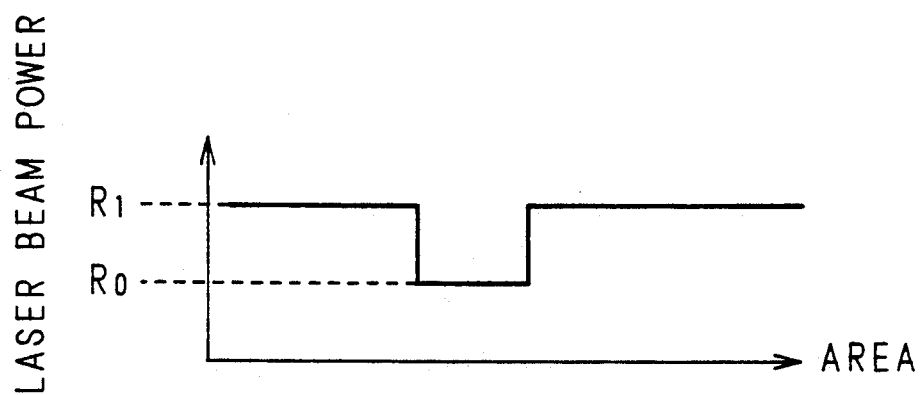
FIG. 3 is a graph showing the characteristic of the change of the laser beam power for recording in the area of the conventional magneto-optic recording medium.
Figure 4:
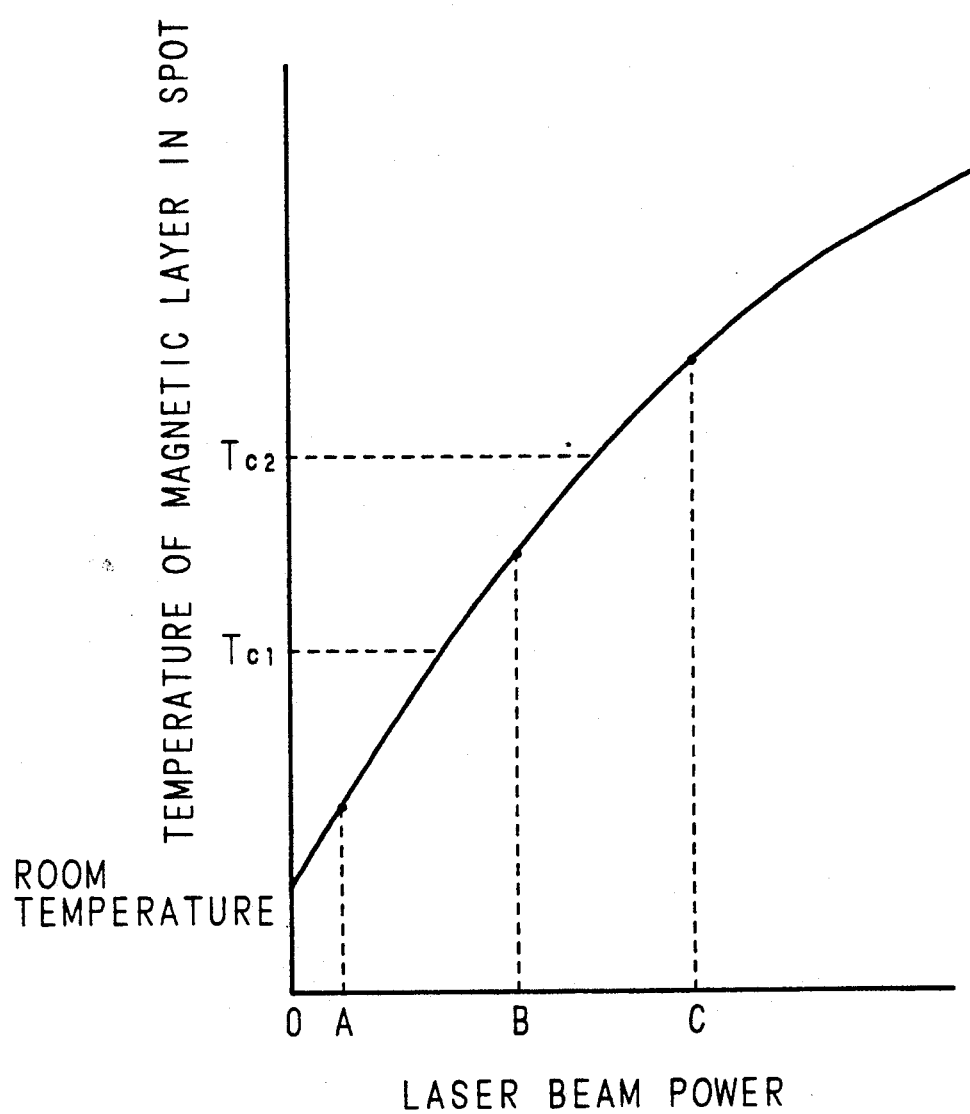
FIG. 4 is a graph showing the characteristic of the relation between the power of the laser beam and the temperature of a magnetic layer in a s pot of the conventional magneto-optic recording medium.
Figure 5:
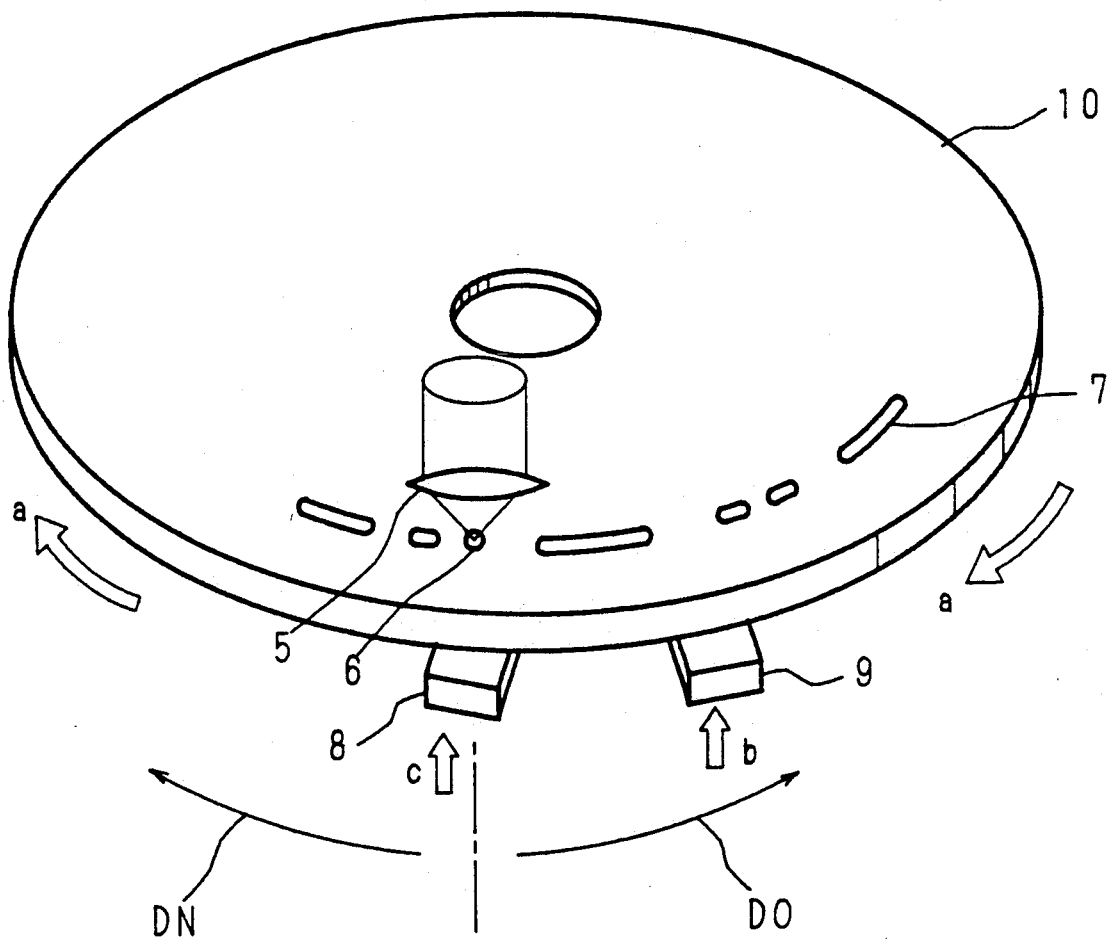
FIG. 5 is a perspective view substantially showing the structure of an optical recording/reproducing apparatus provided with a magneto-optic recording medium according to this invention.
Figure 6:
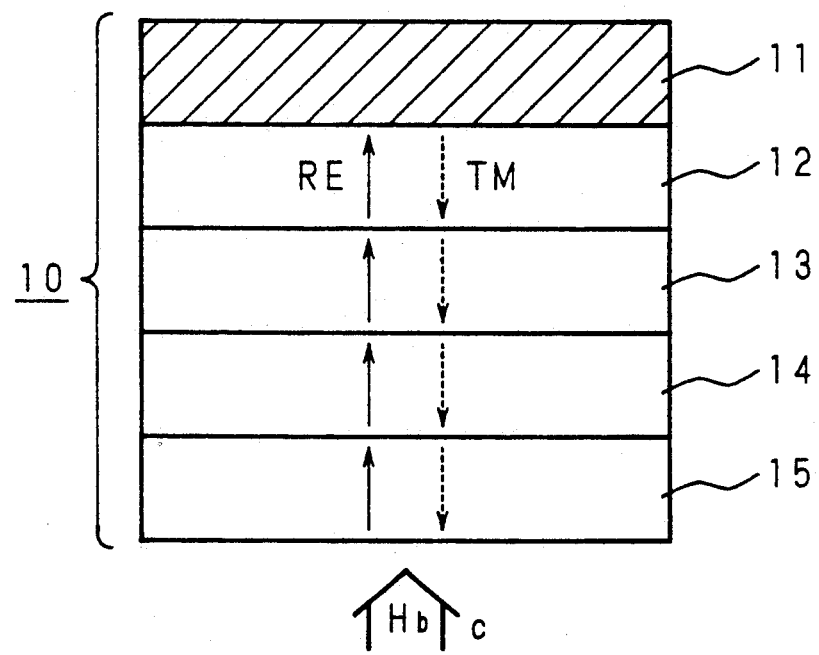
FIG. 6 is a sectional view showing the optically recording/reproducing state of the magneto-optic recording medium according to this invention.

Referring to FIGS. 5 and 6, numerals 5 through 9 represent the same parts as in the conventional example. A magneto-optic recording medium 10 of this invention (referred to as a recording medium 10 hereinbelow) is comprised of a transparent substrate 11 made of glass or plastic, a first magnetic layer 12, a second magnetic layer 13, a third magnetic layer 14 and a fourth magnetic layer 15 sequentially superposed in this order on the transparent substrate 11. These four magnetic layers 12, 13, 14 and 15 are coupled each other between the adjacent layers by the exchange force. It is particularly effective when the four magnetic layers are all composed of an alloy of rare-earth and transition metals.

In the event that each magnetic layer is composed of an alloy of rare-earth and transition metals, the direction and intensity of the magnetization appearing outside of each alloy depends on the relation between the direction and intensity of the sublattice magnetization (magnetic moment per unit volume) of atoms of the transition metal (referred to as TM hereinafter) in the alloy and the direction and intensity of the sublattice magnetization of the rare-earth metal (referred to as RE hereinafter) in the alloy. For example, when the direction and intensity of the sublattice magnetization of the TM is represented by a vector ↑, that of the RE is represented by a vector ↑, and that of the total alloy is represented by a vector ↑, the vector ↑ is the sum of the vectors ↑ and ↑. It is to be noted here that the vectors ↑ and ↑ are always in the reverse direction each other in the alloy due to the interaction between the sublattice magnetization of TM and that of RE. Accordingly, when the intensity of the vector ↑ or ↓ is the same as that of the vector ↑ or ↑, the sum of these vectors, i.e., the vector of the total alloy (namely, the magnetization appearing outside) is zero. The composition of the alloy when the vector thereof is zero is called as a compensation composition. The alloy in the composition other than the compensation composition is magnetized with the same intensity as the difference between the sublattice magnetization of TM and that of RE, and in the same direction ( ↓ or ↑ ) as the direction of the larger vector. Therefore, ↑↓ appears as ↑, while ↓ appears as ↓.

When the vector of the sublattice magnetization of RE in an alloy is larger than the vector of the sublattice magnetization of TM, the composition of the alloy is called as RE-rich. The aforementioned four magnetic layers 12-15 are either TM-rich or RE rich.

For example, the magnetic layer 12-15 are formed of ferrimagnetic material on the glass substrate through sputtering or the like, specifically, in the following constitution:

|  | Composition | Thickness | Type |
|---|---|---|---|
| 1st | $Tb_{23}(Fe_{90}Co_{10})_{77}$ | 800Å | Compensation |
| 2nd | $(Gd_{50}Dy_{50})_{25}(Fe_{70}Co_{30})_{75}$ | 1000Å | RE-rich |
| 3rd | $Tb_{18}Fe_{82}$ | 100Å | TM-rich |
| 4th | $Tb_{25}Co_{75}$ | 300Å | RE-rich |

The adjacent magnetic layers are coupled each other by the exchange force. The fourth magnetic layer 15 has a coercive force of 7 KOe at room temperature, and has a coercive force not smaller than 700 Oe from the room temperature to about 300° C. Therefore, the magnetization of the fourth magnetic layer 15 is never inverted at about the room temperature by the initializing magnetic field, nor inverted by the temperature rise subsequent to the irradiation of the laser beam for recording. When the magnetization of the whole fourth magnetic layer 15 is once oriented upwards by an electromagnet or the like after the layer is formed, the direction of magnetization of the fourth magnetic layer 15 can be maintained semi-permanently. The fourth magnetic layer 15 according to this embodiment is changed into the compensation composition approximately at 120° C. and becomes TM-rich over 120° C., so that the direction of magnetization appears downwards. However, this is because the symbol of the direction of magnetization is changed in compliance with the temperature change, not resulting from the inversion of the magnetization. The "inversion of the magnetization" referred to above means the inversion of the sublattice magnetization. When the magnetization of the whole fourth magnetic layer is oriented upwards, the sublattice of TM of the fourth magnetic layer 15 is magnetized downwards. This downward magnetization is maintained semi-permanently. In the meantime, the exchange force exerted between the adjacent magnetic layers is effective to make the direction of sublattice magnetizations of each TM coincident with each other. Therefore, when the sublattice magnetization of TM of the fourth magnetic layer 15 is oriented downwards at all times, the direction of sublattice magnetization of TM of the second magnetic layer 13 is always kept downwards by the exchange force through the third magnetic layer 14.

The third magnetic layer 14 has two characteristic features, i.e., (1) film thickness is considerably small, and (2) Curie point is low.

Since the third magnetic layer 14 is considerably thin, it is strongly influenced by the exchange force, so that the sublattice magnetization of TM of the third magnetic layer 14 is oriented downwards in the same direction as the sublattice magnetization of TM of the fourth magnetic layer 15. Although the third magnetic layer 14 is coupled not only to the fourth magnetic layer 15, but to the second magnetic layer 13, it is coupled to the fourth magnetic layer 15 more strongly, whereby its magnetization is oriented in the direction coincident with that of the fourth magnetic layer 15. The exchange force from the fourth magnetic layer 15 is exerted to the second magnetic layer 13 through the third magnetic layer 14, so that the sublattice magnetization of TM of the second magnetic layer 13 is oriented downwards. However, the exchange force is not always exerted. Since the Curie point of the third magnetic layer 14 is as low as about 100° C., the exchange force is not exerted when the temperature of the medium exceeds 100° C. through irradiation of the laser beam during recording. As described above, the exchange force is exerted from the fourth magnetic layer 15 to the second magnetic layer 13 depending on the third magnetic layer 14. That is, when the temperature of the medium is higher than the Curie point of the third magnetic layer 14, the exchange force is not exerted (turned OFF). In contrast, when the temperature of the medium is lower than the Curie point of the third layer 14, the exchange force is exerted (turned ON).

In summary, the function of the fourth and third magnetic layers 15 and 14 is as follows;

4th magnetic layer 15: to exert the exchange force through the exchange coupling so that the direction of sublattice magnetization of TM of the second magnetic layer 13 is oriented downwards.

3rd magnetic layer 14: to turn ON and OFF the exchange coupling in accordance with the temperature of the medium.

The first and second magnetic layers 12 and 13 serve similarly to the conventional ones.

Supposing that Curie points of the first through fourth magnetic layers 12-15 are respectively $T_{c1}$, $T_{c2}$, $T_{c3}$ and $T_{c4}$, they satisfy $T_{c4} > T_{c2} > T_{c1} > T_{c3}$. Moreover, the layers 12-15 should satisfy the following magnetic characteristics at the room temperature.

(1) In the initializing magnetic field $H_{ini}$, the direction of sublattice magnetization of TM of the third magnetic layer 14 is the same downwards as that of the fourth magnetic layer 15.

(2) $H_2 < H_{ini} < H_1$, wherein:

$H_1$ represents a magnetic field necessary for changing the direction of the sublattice magnetization of the transition metal of the first magnetic layer (12) from the state where it is coincident with that of the second magnetic layer (13) to the state where it is reverse to that of he second magnetic layer when the direction of the transition metal of the second magnetic layer is reverse to that of the third (14) and fourth (15) magnetic layers. In the first described state a magnetic wall exists between the second and third layers. In the second described state a magnetic wall exists between the first and second layers, and also between the second and third layers.

$H_2$ represents a magnetic field necessary for changing the direction of the sublattice magnetization of the transition metal of the second magnetic layer from the state where it is coincident with that of the first magnetic layer to the state where it is reverse to that of the first magnetic layer when the direction of sublattice magnetization of the transition metal of the first magnetic layer is reverse to that of the third and fourth magnetic layers. In the first described state a magnetic wall exists between the second and third layers. In the second described state a magnetic wall exists between the first and second layers.

$H_{ini}$ represents the initializing magnetic field.

Overwriting operation by using the recording medium 10 will be discussed in detail hereinbelow.

Initializing process

The initializing magnet 9 in FIG. 5 generates the initializing magnetic field of the intensity $H_{ini}$ holds the formula $H_2 < H_{ini} < H_1$ as defined above. So, when the recording medium 10 is rotated in the direction of arrow a, the direction of magnetization of the second magnetic layer 13 passing through the initializing magnet 9 is oriented upwards irrespective of the direction of magnetization of the first magnetic layer 12. In other words, the direction of sublattice magnetization of TM of the second magnetic layer 13 is completely oriented downwards. At this time, the direction of magnetization of the first magnetic layer 12 is not inverted by the influence of the initializing magnetic field or the exchange force of the second magnetic layer 13, so that the direction of magnetization of the first magnetic layer 12 is maintained as it is. As a result, the binary-coded data recorded in the first magnetic layer 12 are never broken during the initializing process.

Overwriting process

In order to record the data "0", namely, to orient the direction of sublattice magnetization of TM of the first magnetic layer 12 downwards, the power of the laser beam corresponds to a power B in FIG. 7. The temperature in the condensing spot 6 is raised at this time up to about the Curie point $T_{c1}$ of the first magnetic layer 12, but does not reach the Curie point $T_{c2}$ of the second magnetic layer 13. In consequence, the magnetization of the first magnetic layer 12 is erased or brought unstable. However, the direction of magnetization of the second magnetic layer 13 is kept upwards as obtained in the initializing process. When the recording medium 10 is further rotated with the condensating spot 6 away and the temperature of the recording medium 10 decreases, the direction of sublattice magnetization of TM of the first magnetic layer 12 is made downwards by the exchange force from the second magnetic layer 13. Thus, the data "0" is written.

In order to record the data "1", that is, to orient the direction of sublattice magnetization of TM of the first magnetic layer 12 upwards, the power of the laser beam corresponds to a power C in FIG. 7. At this time, the temperature in the condensing spot 6 is raised over the Curie point $T_{c1}$ up to about the Curie point $T_{c2}$. As a result, the magnetization of the first magnetic layer 12 is erased, and moreover, the magnetization of the second magnetic layer 13 becomes unstable or erased. When the recording medium 10 is further rotated with the condensing spot 6 away and the temperature of the recording medium 10 decreases, the magnetization of the whole of the second magnetic layer 13 is made upwards by a bias magnetic field $H_b$ in the c direction (upwards) in FIG. 5 by the bias magnet 8. Since the temperature at this time exceeds a compensation temperature of the second magnetic layer 13, the layer 13 is TM-rich. Accordingly, the sublattice magnetization of TM of the second magnetic layer 13 is oriented upwards. When the temperature becomes lower than the Curie point $T_{c1}$, the direction of sublattice magnetization of the first magnetic layer 12 is coincident with that of the second magnetic layer 13 by the exchange force. In other words, the sublattice magnetization of TM of the first magnetic layer 12 is directed upwards, thereby achieving writing of the data "1".

During the overwriting process, the third and fourth magnetic layers 14 and 15 do not work. It is important that the both layers 14 and 15 do not have any function when the data "1" is being recorded. If the exchange force is exerted at around the Curie point $T_{c2}$ from the fourth magnetic layer 15 with the downward sublattice magnetization of TM to the second magnetic layer 13, it prevents the data from being written in the second magnetic layer 13 by the bias magnetic field (that is, preventing the sublattice magnetization of TM of the second magnetic layer 13 from being oriented upwards). As mentioned earlier, however, the exchange coupling between the fourth and second magnetic layer 15 and 13 is turned OFF by the third magnetic layer 14 at about the Curie point $T_{c2}(>T_{c3})$, so that the data can be easily written in the second magnetic layer 13 by the bias magnetic field.

In the manner as above, data can be overwritten at real time on the old data by changing the power of the laser beam to B and C in FIG. 7 in compliance with the binary code "0" and "1" of the data to be recorded.

Although both the "initializing process" and the "overwriting process" are explained hereinabove, the "initializing process" is characteristic of the magneto-optic recording medium of this invention. In the initializing process, the relation of the initializing magnetic field $H_{ini}$ to the magnetic fields $H_2$ and $H_1$ is expressed by the formula $H_2 < H_{ini} < H_1$ as is described earlier. The minimum value of the $H_{ini}$ is $H_2$ according to this formula. therefore, $H_{ini}$ can be smaller by reducing $H_2$. The magnetic field $H_2$ can be expressed by an equation, $$H_2 \text{ (conventional example)} = H_{c2} + \frac{\sigma_{w12}}{2M_{s2}t_2} \quad \text{(a)}$$

wherein $H_{c2}$ represents the coercive force of the second magnetic layer 4, $M_{s2}$ represents the saturation magnetization thereof, $t_2$ represents the film thickness thereof and $\sigma_{w12}$ represents the surface magnetic wall energy stored between the first and second magnetic layers 3 and 4.

On the other hand, the magnetic field $H_2$ in the recording medium 10 with four-superposed structure of this invention can be expressed by an equation, $$H_2 \text{ (this invention)} = H_{c2} + \frac{(\sigma_{w12} - \sigma_{w23})}{2M_{s2}t_2} \quad (b)$$

wherein $\sigma_{w23}$ the surface magnetic wall energy stored between the second and third magnetic layers 13 and 14.

According to the equations (a) and (b), $H_2$ (conventional example) $> H_2$ (this invention) is satisfied, whereby it is clear that $H_{ini}$ can be smaller by the recording medium 1. This is based on the fact that the exchange force from the fourth magnetic layer 15 to the second magnetic layer 13 is exerted in the same direction as $H_{ini}$.

Favorable overwriting operation is confirmed under the following conditions using the magneto-optic recording medium of this embodiment.

| Recording conditions | |
|---|---|
| Rotating number | 2700 r.p.m. |
| Recording frequency | 5.5 MHz ⇌ 3 MHz |
| Recording laser power | changed between 6 mW and 13 mW |
| Bias magnetic field $H_b$ | 300 Oe |
| Initializing magnetic field $H_{ini}$ | 500 Oe |

C/N is 47 dB at 5.5 MHz, and the initializing magnetic field is 500 Oe, not larger than 1/6 as compared with the conventional example, thereby dispensing with an initializing magnet. The bias magnet can be employed instead.

Other embodiments

The other embodiments of this invention will be indicated in Table 1, wherein, except the embodiment 9, overwriting operation is confirmed. Particularly, embodiments 1-6 show favorable operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| | Type of Each Layer | | | | Composition of Each Layer | | | | | | |
|---|---|---|---|---|---|---|---|---|---|---|---|
| No. | First Layer | Second Layer | Third layer | Fourth Layer | First Layer | Second Layer | Third Layer | Fourth Layer | $H_b$ (Oe) | $H_{ini}$ (Oe) | C/N (dB) |
| 2 | TM | (RE) | TM | (RE) | $Tb_{22}(Fe_{90}Co_{10})_{78}$ | $(Gd_{25}Dy_{75})_{26}(Fe_{70}Co_{30})_{74}$ | $Tb_{18}Fe_{82}$ | $Tb_{26}Co_{74}$ | 350 | 600 | 46 |
| 3 | TM | (RE) | TM | TM | $Tb_{21}(Fe_{88}Co_{12})_{79}$ | $Tb_{27}(Fe_{80}Co_{20})_{73}$ | $Tb_{18}Fe_{82}$ | $Tb_{22}Co_{78}$ | 200 | 500 | 43 |
| 4 | TM | (RE) | TM | (RE) | $Tb_{21}(Fe_{88}Co_{12})_{79}$ | $Tb_{27}(Fe_{74}Co_{26})_{73}$ | $Tb_{18}Fe_{82}$ | $Tb_{26}Co_{74}$ | 350 | 700 | 43 |
| 5 | TM | (RE) | TM | TM | $Tb_{22}(Fe_{85}Co_{15})_{78}$ | $(Tb_{73}Dy_{27})_{27}(Fe_{70}Co_{30})_{73}$ | $Tb_{18}(Fe_{95}Co_5)_{82}$ | $Tb_{22}Co_{78}$ | 300 | 700 | 44 |
| 6 | TM | (RE) | TM | TM | $Tb_{20}(Fe_{90}Co_{10})_{80}$ | $(Tb_{73}Dy_{27})_{27}(Fe_{70}Co_{30})_{73}$ | $Tb_{18}Fe_{82}$ | $Tb_{22}Co_{78}$ | 200 | 800 | 44 |
| 7 | TM | TM | TM | (RE) | $Tb_{20}(Fe_{90}Co_{10})_{80}$ | $(Gd_{30}Dy_{70})_{18}(Fe_{68}Co_{32})_{82}$ | $Tb_{18}(Fe_{90}Co_{10})_{82}$ | $Tb_{26}Co_{74}$ | 200 | −1000 | 37 |
| 8 | (RE) | TM | TM | (RE) | $Tb_{24}(Fe_{90}Co_{10})_{76}$ | $(Gd_{30}Dy_{70})_{18}(Fe_{68}Co_{32})_{82}$ | $Tb_{18}Fe_{82}$ | $Tb_{26}Co_{74}$ | 250 | −900 | 36 |
| 9 | TM | TM | RE | (RE) | $Tb_{22}(Fe_{95}Co_5)_{78}$ | $(Gd_{30}Dy_{70})_{18}(Fe_{68}Co_{32})_{82}$ | $Tb_{28}Fe_{72}$ | $Tb_{26}Co_{74}$ | — | — | x |

Note 1;
TM: TM-rich at room temperature
RE: RE-rich at room temperature to Curie point
(RE): RE-rich at room temperature and having compensation temperature
Note 2:
+ is upward in $H_b$ and $H_{ini}$
Note 3;
C/N is obtained at 2,700 rpm and 5.5 MHz

What is claimed is:

1. A magneto-optic recording medium which is overwritten with an initializing magnetic field and a biasing magnetic field, comprising:
   a first magnetic layer with vertical magnetic anisotropy;
   a second magnetic layer superposed on said first magnetic layer and coupled thereto by an exchange force;
   a third magnetic layer superposed on said second magnetic layer and coupled thereto by an exchange force; and
   a fourth magnetic layer superposed on said third magnetic layer and coupled thereto by an exchange force,
   wherein, said first through fourth magnetic layers satisfy the following conditions:
   (A) $T_{c3} < T_{c1} < T_{c2} < T_{c4}$ wherein $T_{c1}$, $T_{c2}$, $T_{c3}$ and $T_{c4}$ represent Curie points of the first, the second, the third and fourth magnetic layer respectively,
   (B) the magnetization of said fourth magnetic layer is not inverted during recording and reproducing, wherein the coercive force of the fourth layer $H_{c4}$ at the maximum temperature to which the recording media reaches in the recording timing, is set larger than the magnetic field applied thereto,
   (C) $H_1 > H_2$, wherein,
      $H_1$ represents a magnetic field necessary for changing the direction of sublattice magnetization of the transition metal of said first magnetic layer from the state where it is coincident with that of said second magnetic layer to the state where it is reverse to that of said second magnetic layer when the direction of sublattice magnetization of the transition metal of said second magnetic layer is reverse to that of said third and fourth magnetic layers, and
      $H_2$ represents a magnetic field necessary for changing the direction of sublattice magnetization of the transition metal of said second magnetic layer from the state where it is coincident with that of said first magnetic layer to the state where it is reverse to that of said first magnetic layer when the direction of sublattice magnetization of the transition metal of said first magnetic layer is reverse to that of said third and fourth magnetic layers, (D) the magnetization of said first magnetic layer is not inverted by the inversion of the magnetization of said second magnetic layer at room temperature, (E) the second magnetic layer comprises an alloy of rare earth metal and transition metal and the alloy being rare earth metal rich at room temperature and having a compensation temperature higher than room temperature, (F) the direction of sublattice magnetization of transition metal of said third and fourth magnetic layers is coincident with each other in an exterior magnetic field, (G) $H_{c2}+(\sigma W_{12}-\sigma W_{23})/(2M_{s2}t_2)<H_{ini}$ wherein $H_{c2}$ the coercive force of the second layer $\sigma w_{12}$: the exchange force of the first and the second layers $\sigma w_{23}$: the exchange force of the second and the third layers $M_{s2}$: the saturation magnetization of the second layer $t_2$: the thickness of the second layer $H_{ini}$: the initialization magnetizing field.

2. A magneto-optic recording medium as set forth in claim 1, wherein said third magnetic layer is composed of an alloy of rare-earth and transition metals and further wherein said transition metal has a greater magnetic moment than said rare earth at room temperature.

3. A magneto-optic recording medium as set forth in claim 1, further comprising a substrate made of glass or plastic on which said first magnetic layer is superposed.

4. A magneto-optic recording medium as set forth in claim 1, wherein said fourth layer comprises TbCo.

5. An optical recording/reproducing apparatus comprising:
a magneto-optical recording medium including
a first magnetic layer with vertical magnetic anisotrophy;
a second magnetic layer superposed on said first magnetic layer and coupled thereto by an exchange force;
a third magnetic layer superposed on said second magnetic layer and coupled thereto by an exchange force; and
a fourth magnetic layer superposed on said third magnetic layer and coupled thereto by an exchange force,
wherein, said first through fourth magnetic layers satisfy the following conditions:

(A) $T_{c3}<T_{c1}<T_{c2}<T_{c4}$ wherein $T_{c1}$, $T_{c2}$, $T_{c3}$ and $T_{c4}$ represent Curie points of the first, the second, the third and fourth magnetic layer respectively, (B) the magnetization of said fourth magnetic layer is not inverted during recording and reproducing, wherein the coercive force of the fourth layer $H_{c4}$ at the maximum temperature to which the recording media reaches in the recording timing, is set larger than the magnetic field applied thereto, (C) $H_1>H_2$, wherein, $H_1$ represents a magnetic field necessary for changing the direction of sublattice magnetization of the transition metal of said first magnetic layer from the state where it is coincident with that of said second magnetic layer to the state where it is reverse to that of said second magnetic layer when the direction of sublattice magnetization of the transition metal of said second magnetic layer is reverse to that of said third and fourth magnetic layers, and $H_2$ represents a magnetic field necessary for changing the direction of sublattice magnetization of the transition metal of said second magnetic layer from the state where it is coincident with that of said first magnetic layer to the state where it is reverse to that of said first magnetic layer when the direction of sublattice magnetization of the transition metal of said first magnetic layer is reverse to that of said third and fourth magnetic layers, (D) the magnetization of said first magnetic layer is not inverted by the inversion of the magnetization of said second magnetic layer at room temperature, (E) the second magnetic layer comprises an alloy of rare earth metal and transition metal and the alloy being rare earth metal rich at room temperature and having a compensation temperature higher than room temperature, (F) the direction of sublattice magnetization of transition metal of said third and fourth magnetic layers is coincident with each other in an exterior magnetic field, (G) $H_{c2}+(\sigma W_{12}-\sigma W_{23})/(2M_{s2}t_2)<H_{ini}$ wherein $H_{c2}$ the coercive force of the second layer $\sigma w_{12}$: the exchange force of the first and the second layers $\sigma w_{23}$: the exchange force of the second and the third layers $M_{s2}$: the saturation magnetization of the second layer $t_2$: the thickness of the second layer an objective lens for condensing laser beams on said magneto-optic recording medium, an initializing magnet for applying an initializing magnetic field to said magneto-optic recording medium; and a bias magnet for applying a bias magnetic field to said magneto-optic recording medium for writing.

6. An optical recording/reproducing apparatus as set forth in claim 5, satisfying $H_2<H_{ini}<H_1$, wherein, $H_{ini}$ represents the initializing magnetic field applied to said magneto-optic recording medium by said initializing magnet.

7. An optical recording/reproducing apparatus as set forth in claim 5, wherein said initializing magnetic field is not larger than 500 Oe.

8. A magneto-optic recording medium which is overwritten with an initializing magnetic field and a biasing magnetic field, comprising:
a first magnetic layer with vertical magnetic anisotrophy;
a second magnetic layer superposed on said first magnetic layer and coupled thereto by an exchange force;
a third magnetic layer superposed on said second magnetic layer and coupled thereto by an exchange force; and
a fourth magnetic layer superposed on said third magnetic layer and coupled thereto by an exchange force,
wherein, said first through fourth magnetic layers satisfy the following conditions:

(A) $T_{c3}<T_{c1}<T_{c2}<T_{c4}$ wherein $T_{c1}$, $T_{c2}$, $T_{c3}$ and $T_{c4}$ represent Curie points of the first, the second, the third and fourth magnetic layer respectively, (B) the magnetization of said fourth magnetic layer is not inverted during recording and reproducing, wherein the coercive force of the fourth layer $H_{c4}$ at the maximum temperature to which the recording media reaches in the recording timing, is set larger than the magnetic field applied thereto, (C) $H_1 > H_2$, wherein, $H_1$ represents a magnetic field necessary for changing the direction of sublattice magnetization of the transition metal of said first magnetic layer from the state where it is coincident with that of said second magnetic layer to the state where it is reverse to that of said second magnetic layer when the direction of sublattice magnetization of the transition metal of said second magnetic layer is reverse to that of said third and fourth magnetic layers, and $H_2$ represents a magnetic field necessary for changing the direction of sublattice magnetization of the transition metal of said second magnetic layer from the state where it is coincident with that of said first magnetic layer to the state where it is reverse to that of said first magnetic layer when the direction of sublattice magnetization of the transition metal of said first magnetic layer is reverse to that of said third and fourth magnetic layers, (D) the magnetization of said first magnetic layer is not inverted by the inversion of the magnetization of said second magnetic layer at room temperature.

9. An optical recording/reproducing apparatus comprising:

a magneto-optical recording medium including a first magnetic layer with vertical magnetic anisotrophy;

a second magnetic layer superposed on said first magnetic layer and coupled thereto by an exchange force;

a third magnetic layer superposed on said second magnetic layer and coupled thereto by an exchange force; and a fourth magnetic layer superposed on said third magnetic layer and coupled thereto by an exchange force, wherein, said first through fourth magnetic layers satisfy the following conditions:

(A) $T_{c3} < T_{c1} < T_{c2} < T_{c4}$ wherein $T_{c1}$, $T_{c2}$, $T_{c3}$ and $T_{c4}$ represent Curie points of the first, the second, the third and fourth magnetic layer respectively, (B) the magnetization of said fourth magnetic layer is not inverted during recording and reproducing, wherein the coercive force of the fourth layer $H_{c4}$ at the maximum temperature to which the recording media reaches in the recording timing, is set larger than the magnetic field applied thereto, (C) $H_1 > H_2$, wherein, $H_1$ represents a magnetic field necessary for changing the direction f sublattice magnetization of the transition metal of said first magnetic layer from the state where it is coincident with that of said second magnetic layer to the state where it is reverse to that of said second magnetic layer when the direction of sublattice magnetization of the transition metal of said second magnetic layer is reverse to that of said third and fourth magnetic layers, and $H_2$ represents a magnetic field necessary for changing the direction of sublattice magnetization of the transition metal of said second magnetic layer from the state where it is coincident with that of said first magnetic layer to the state where it is reverse to that of said first magnetic layer when the direction of sublattice magnetization of the transition metal of said first magnetic layer is reverse to that of said third and fourth magnetic layers, (D) the magnetization of said first magnetic layer is not inverted by the inversion of the magnetization of said second magnetic layer at room temperature, an objective lens for condensing laser beams on said magneto-optic recording medium, an initializing magnet for applying an initializing magnetic field to said magneto-optic recording medium; and a bias magnet for applying a bias magnetic field to said magneto-optic recording medium for writing.

10. A magneto-optic recording medium which is overwritten with an initializing magnetic field and a biasing magnetic field, comprising:

a first magnetic layer with vertical magnetic anisotrophy;

a second magnetic layer superposed on said first magnetic layer and coupled thereto by an exchange force;

a third magnetic layer superposed on said second magnetic layer and coupled thereto by an exchange force; and a fourth magnetic layer superposed on said third magnetic layer and coupled thereto by an exchange force, wherein, said first through fourth magnetic layers satisfy the following conditions:

(A) the magnetization of said first magnetic layer is not inverted by the inversion of the magnetization of said second magnetic layer at room temperature, (B) the second magnetic layer comprises an alloy of rare earth metal and transition metal and the alloy being rare earth metal rich at room temperature and having a compensation temperature higher than room temperature, (C) the direction of sublattice magnetization of transition metal of said third and fourth magnetic layers is coincident with each other in an exterior magnetic field, (D) $H_{c2} + (\sigma W_{12} - \sigma W_{23})/(2M_{s2}t_2) < H_{ini}$ wherein $H_{c2}$ the coercive force of the second layer $\sigma w_{12}$: the exchange force of the first and the second layers $\sigma w_{23}$: the exchange force of the second and the third layers $M_{s2}$: the saturation magnetization of the second layer $t_2$: the thickness of the second layer $H_{ini}$: the initialization magnetizing field.

11. An optical recording/reproducing apparatus comprising:

a magneto-optical recording medium including a first magnetic layer with vertical magnetic anisotrophy;

a second magnetic layer superposed on said first magnetic layer and coupled thereto by an exchange force;

a third magnetic layer superposed on said second magnetic layer and coupled thereto by an exchange force; and a fourth magnetic layer superposed on said third magnetic layer and coupled thereto by an exchange force, wherein, said first through fourth magnetic layers satisfy the following conditions:

(A) the magnetization of said first magnetic layer is not inverted by the inversion of the magnetization of said second magnetic layer at room temperature, (B) the second magnetic layer comprises an alloy of rare earth metal and transition metal and the alloy being rare earth metal rich at room temperature and having a compensation temperature higher than room temperature, (C) the direction of sublattice magnetization of transition metal of said third and fourth magnetic layers is coincident with each other in an exterior magnetic field, (D) $H_{c2}+(\sigma W_{12}-\sigma W_{23})/(2M_{s2}t_2)<H_{ini}$ wherein $H_{c2}$ the coercive force of the second layer $\sigma w_{12}$: the exchange force of the first and the second layers $\sigma w_{23}$: the exchange force of the second and the third layers $M_{s2}$: the saturation magnetization of the second layer $t_2$: the thickness of the second layer $H_{ini}$: the initialization magnetizing field;

an objective lens for condensing laser beams on said magneto-optic recording medium, an initializing magnet for applying an initializing magnetic field to said magneto-optic recording medium; and a bias magnet for applying a bias magnetic field to said magneto-optic recording medium for writing.

* * * * *